Figure 1:
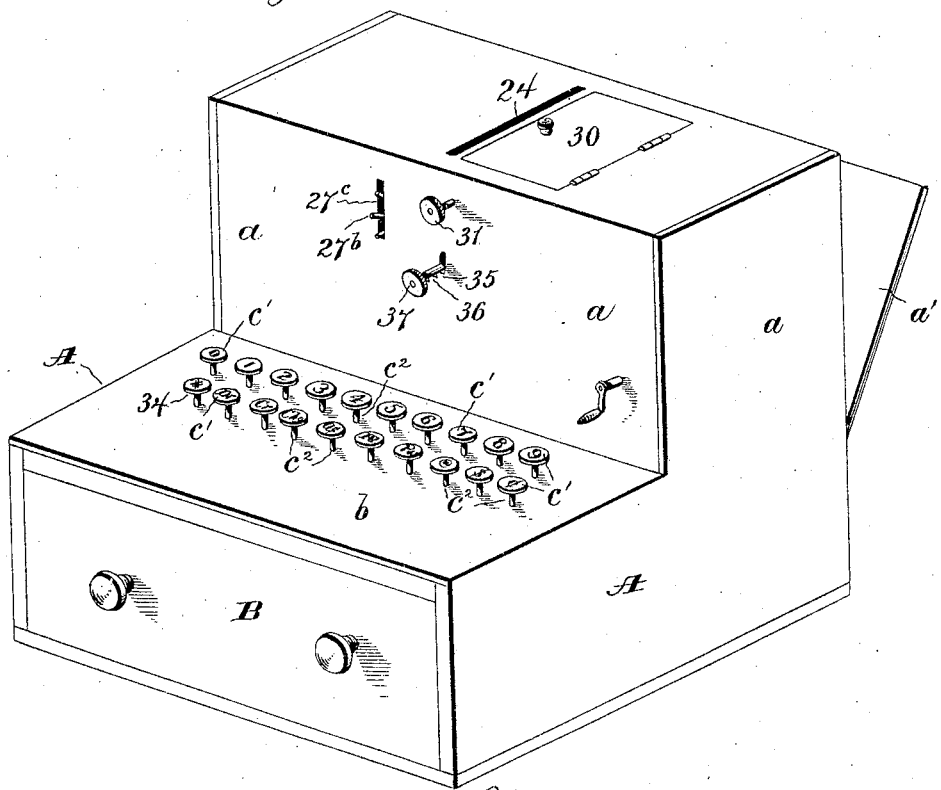

(No Model.) 4 Sheets—Sheet 1.

G. P. GASTON.
COMBINED CASH RECEIVER AND RECORDER AND TYPE WRITING MACHINE.

No. 575,828. Patented Jan. 26, 1897.

Witnesses
Jas. E. Hutchinson
G. F. Downing

Inventor
George P. Gaston,
By H. A. Seymour
Attorney (No Model.)  4 Sheets—Sheet 2.
G. P. GASTON.
COMBINED CASH RECEIVER AND RECORDER AND TYPE WRITING MACHINE.
No. 575,828.  Patented Jan. 26, 1897.
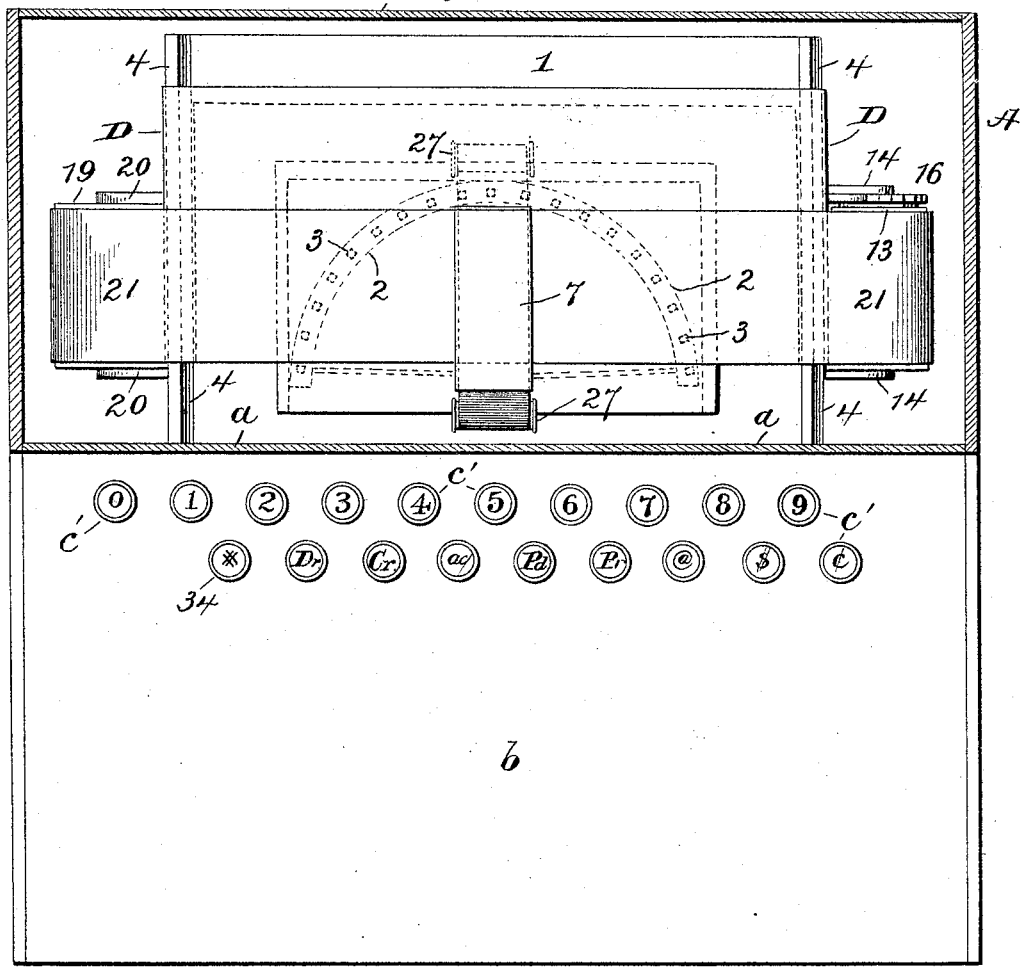
Witnesses
Jas. Hutchinson.
G. F. Downing.
Inventor
George P. Gaston,
By H. A. Seymour
Attorney (No Model.) 4 Sheets—Sheet 3.
G. P. GASTON.
COMBINED CASH RECEIVER AND RECORDER AND TYPE WRITING MACHINE.
No. 575,828. Patented Jan. 26, 1897.
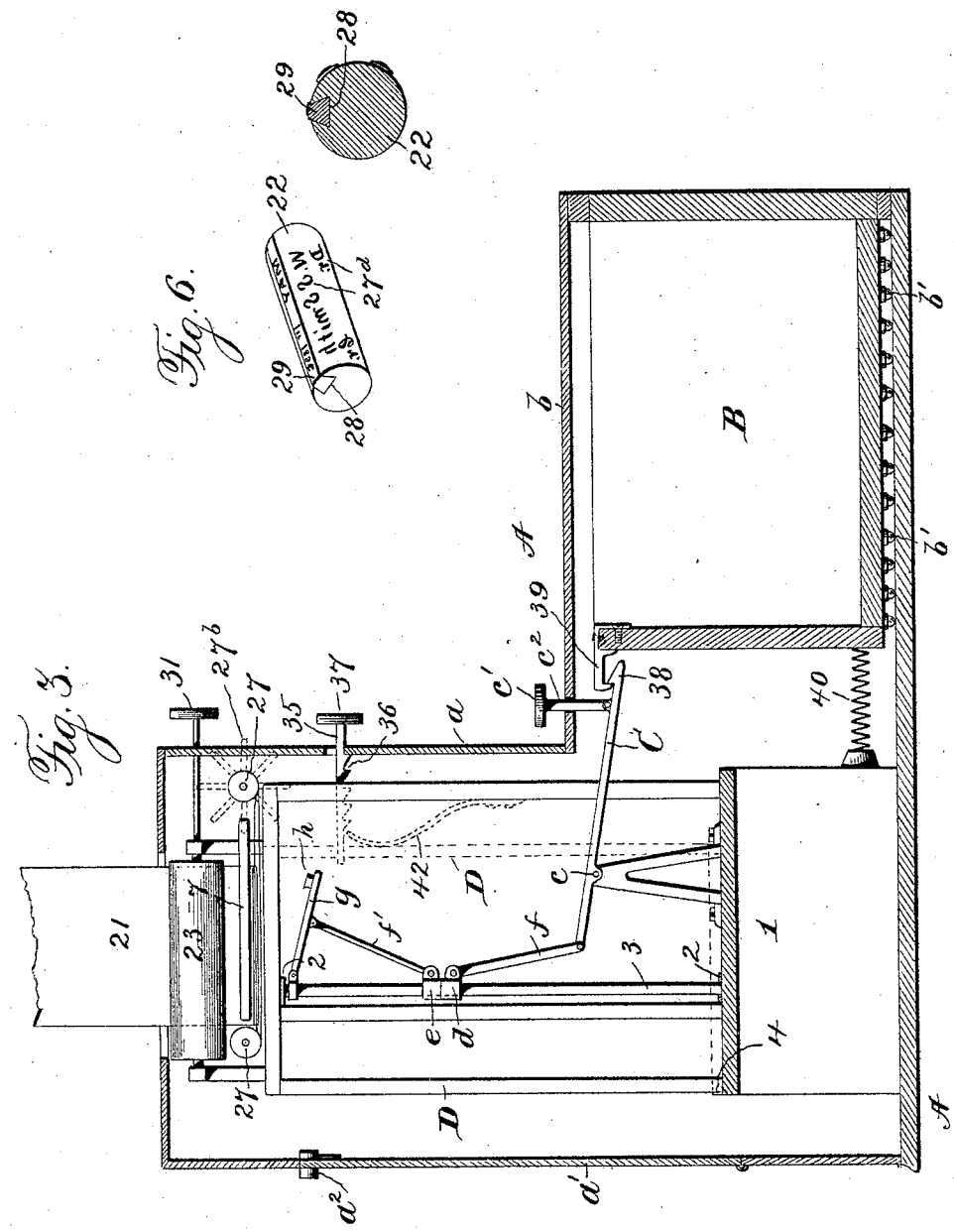
Witnesses
Jas. E. Hutchinson.
G. F. Downing.
Inventor
George P. Gaston,
By H. A. Seymour
Attorney

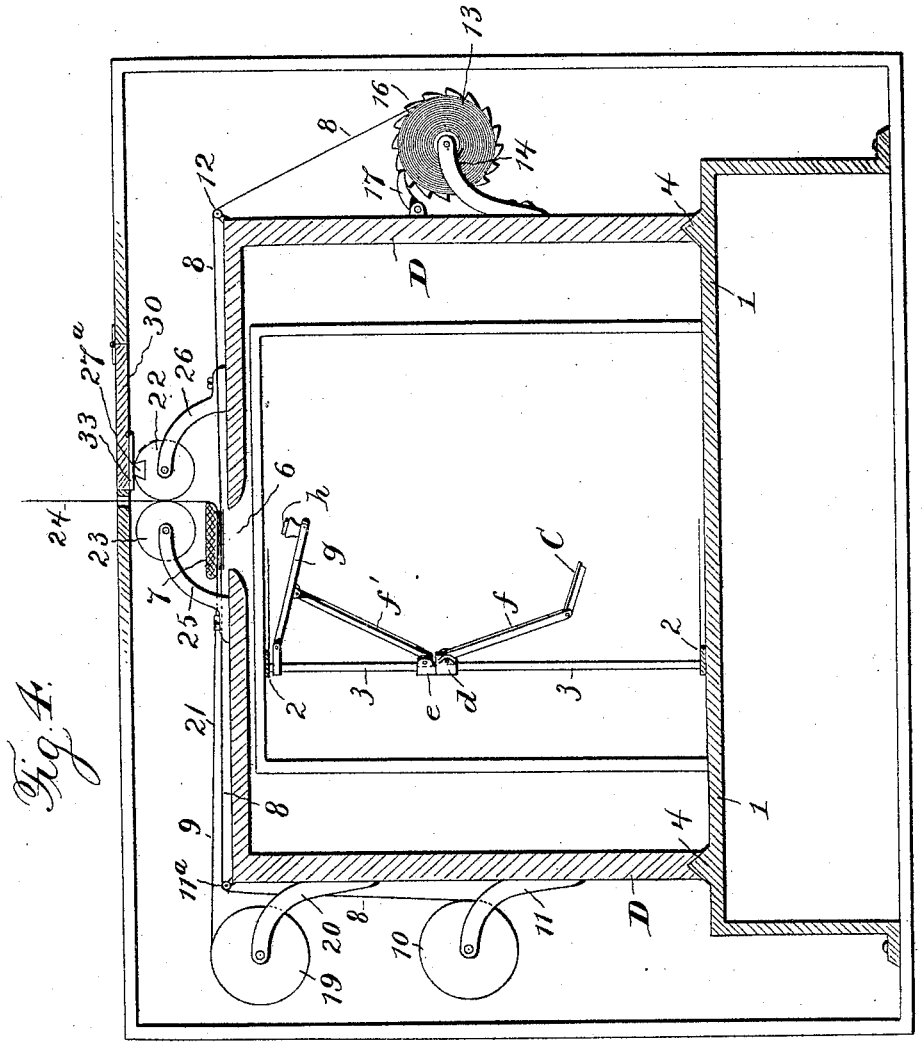

UNITED STATES PATENT OFFICE.

GEORGE P. GASTON, OF SILVER CREEK, NEW YORK.

COMBINED CASH RECEIVER AND RECORDER AND TYPE-WRITING MACHINE.

SPECIFICATION forming part of Letters Patent No. 575,828, dated January 26, 1897.

Application filed July 23, 1896. Serial No. 600,281. (No model.)

*To all whom it may concern:*

Be it known that I, GEORGE P. GASTON, a resident of Silver Creek, in the county of Chautauqua and State of New York, have invented certain new and useful Improvements in a Combined Cash Receiver and Recorder and Type-Writing Machine; and I do hereby declare the following to be a full, clear, and exact description of the invention, such as will enable others skilled in the art to which it appertains to make and use the same.

My invention relates to a combined cash receiver and recorder and type-writing machine, the object of the invention being to provide an apparatus by means of which all business transactions can be indicated on strips of paper for the purpose of recording the same and for the information of a customer.

A further object is to produce a machine by means of which to accurately indicate on strips of paper a debit and a credit account.

A further object is to construct a machine by means of which duplicate "bills," "receipts," or "statements" of any business transaction in a store or other place of business can be prepared, one of such bills, receipts, or statements being retained in the machine to constitute a record and the other delivered to a customer.

A further object is to provide a machine by means of which statements of transactions can be indicated in duplicate on sheets of paper, one statement being retained in the machine and the duplicate delivered to a customer, and to provide devices by means of which the business-card of the merchant and the date of the transaction can be printed on the duplicate statement.

A further object is to construct an apparatus of the character above indicated with a money-receptacle and to provide simple and efficient locking and releasing devices for said receptacle, and also to provide means for making a record of each time the money-receptacle is opened.

A further object is to produce a combined cash receiver and recorder and type-writing machine which shall be comparatively simple in construction and which shall be effectual in all respects in the performance of its functions.

With these objects in view the invention consists in an apparatus comprising a cash-receiver, a recorder, and devices for printing a business-card and date on a strip of paper, in addition to figures and characters indicating a business transaction.

The invention also consists in a machine constructed and adapted to indicate on strips of paper a debit and a credit account.

The invention also consists in certain novel features of construction and combinations and arrangements of parts, as hereinafter set forth, and pointed out in the claims.

Figure 5:
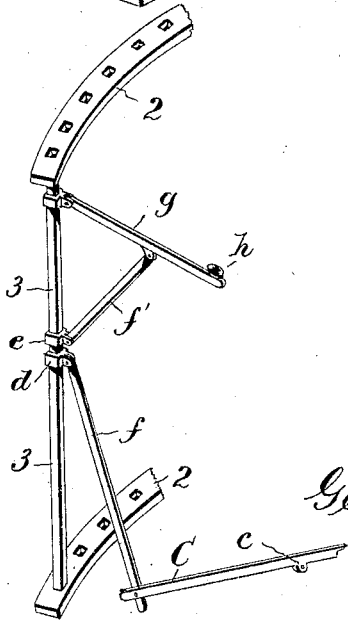

In the accompanying drawings, Figure 1 is an exterior view of my improved apparatus. Fig. 2 is a plan view. Fig. 3 is a sectional view showing the details of the printing mechanism. Fig. 4 is a sectional view taken at right angles to Fig. 3. Fig. 5 is a view showing certain details of the printing mechanism. Fig. 6 is a detail view of the roller by which the business-card and date are printed on the statement handed to the customer.

A represents a casing comprising a vertical portion $a$, in which the printing and recording mechanisms are located, and a horizontal portion $b$, in which the cash drawer or receiver B is located, the latter being preferably mounted on balls or rollers $b'$. The back of the portion $a$ of the casing is closed by a hinged door $a'$, normally secured by a combination-lock $a^2$, whereby to facilitate access to the operating mechanism. In the lower part of the vertical portion of the casing a base 1 is located, and on this base a semicircular frame is disposed, said frame being composed of semicircular plates 2 and vertical bars 3, the latter being made angular in cross-section and entering similarly-shaped holes in the curved plates 2 2. The bars 3 serve as guides for parts of the printing mechanism, and as all the type-bars, key-levers, and intermediate mechanism are the same in construction a detailed description of one set of these devices will suffice for all.

C indicates a key-lever having a fulcrum between its ends on a support $c$ and provided at its inner end with a key $c'$, the stem $c^2$ of which projects through the cover of the horizontal portion $b$ of the casing A. Two collars $d\ e$ are mounted to slide on the guide-bar 3, (but prevented from turning thereon owing to the angular cross-section of said rod,) and to the lower collar *d* one end of a rod or link *f* is pivotally connected, the other end of said rod or link being pivotally attached to the forward end of the key-lever C. A type-bar *g* is pivotally connected to the upper end of the guide-bar 3 and provided at its free end with a type *h*. A rod or link *f'* is pivotally connected at one end to the movable collar *e* and at the other end to the type-bar *g* at a point intermediate of the ends of the latter.

The frame which supports the printing mechanism is inclosed by a movable frame D, which is mounted (preferably on balls) to slide on ways 4 on the base 1, and the top 5 of the sliding frame D is provided with an opening 6, through which the type *h* are adapted to pass, as shown in Fig. 4, when the keys are depressed. A rubber pad 7 is disposed immediately over the opening 6, and under this pad two strips of paper 8 9 pass. The strip 8 is supplied from a roll 10, mounted in a bracket 11, secured to the movable frame D, and, after passing over a roller 11ª and under the pad 7 and over a small roller 12, is wound on a drum 13, supported in a bracket 14, secured to the movable frame D, and the strip of paper is kept taut by means of a spring 15, connected with said drum. The shaft of drum 13 is provided with a ratchet-wheel 16, with which a dog 17 engages. The shaft of the drum 13 is also provided with a crank-arm 18, located outside the casing, whereby to wind the strip 8 on said drum. Another supply-roll 19 of paper is mounted in a bracket 20, secured to the movable frame D, and the strip 21 from this roll passes under the pad 7, then upwardly between two rollers 22 23, and finally out through a slot 24 in the top of the casing, said rollers 22 23 being mounted in suitable brackets 25 26, secured to the frame D. Small rollers 27 27 are mounted at the respective ends of the slot 6 in the movable frame or carriage D, and over these rollers an endless inking-ribbon 27ª passes, said ribbon passing under the strip 8 and between said strip 8 and the upper strip 21. The journal of one of the rollers 27 is provided with a wheel 27ᵇ, the spokes of which project through a slot 27ᶜ in the casing. By means of this wheel the inking-ribbon can be fed.

From the above construction and arrangement of parts it will be seen that when a key is depressed the corresponding type will be projected through the slot 6 and made to strike the inking-ribbon passing under the pad 7, thus causing an impression to be made on both strips of paper 8 and 21. The roller 22, above referred to, is provided with rubber-type 27ᵈ for printing the business-card of the owner of the machine on the strip 21. The roller 22 is also provided with a dovetailed slot 28 for the reception of a type-block 29, containing a date, said type-block being removable, so that the date can be changed. The changing of the date-block is facilitated by a hinged door 30 at the top of the casing immediately over the roller 22. The shaft of the roller 22 is projected through the front of the casing and provided with a knob 31, whereby to turn it. When the desired data shall have been printed on the strips of paper, (in a manner more fully explained farther on,) the knob 31 will be turned, thus causing the end of the strip 21 to be fed through the slot in the upper end of the casing A and at the same time causing the roller 22 to print the business-card and the date on said strip 21. The statement thus printed and projected through the top of the machine will be torn off and handed to the customer, while the statement or data printed on the strip 8 will remain in the machine, said strip 8 being wound on the drum 13, as above explained. The type on the roller 22 are supplied with ink from an inking-pad 33, attached to the under side of the door 30.

The types corresponding to ten of the keys are made with figures "1," "2," "3," "4," "5," "6," "7," "8," "9," "0." The type corresponding to the key 34 is provided with any suitable character designed to designate on the strips of paper that the cash-drawer has been opened, and the remaining types are made with any suitable letters or characters, such as "$," "Dr.," "Cr.," "Chg.," "⅄," "Pd.," or other characters or words, according to the line of business with which the machine is to be used.

A bar 35, having ratchet-teeth 36, is pivotally attached to the movable frame or carriage D and projects through a slot in the front of the vertical portion of the casing A, said bar being provided at its free end with a knob 37. By means of this bar the frame or carriage D can be moved, and said frame or carriage will be held in any position to which it may be moved by the engagement of one of the teeth 36 with a tooth at the base of the slot through which said bar passes. By this means the characters, figures, or words can be printed on the strips at any desired point between the edges thereof. Thus the words "Dr." and "Cr." can be produced on the strips at different points, and figures can be printed under the same to indicate debts and credits. In this manner an entire statement can be printed by the machine, showing the various items of an account, the credits on the account, and the balance due. If desired, types and their operating mechanism might be provided for all the letters of the alphabet, so that the data printed by the machine will be unlimited.

Each key-lever C is provided at its inner end with a hook or latch 38, and the cash-drawer B is provided at its rear end with one or any desired number of catches 39 to be engaged by the hooks or latches on the key-levers, and thus retain the drawer locked. When the drawer shall have been released, it will be forced out by means of a spring 40. If the cash-drawer is provided with only one catch 39, that catch will be arranged to be engaged by the hook or latch on the key-lever corresponding with the key 34, so that when the latter is operated to release the drawer the character on the type corresponding to said key will indicate on the strips of paper that the drawer has been opened.

It is evident that the drawer may be provided with a series of catches 39 to be engaged by a corresponding number of key-levers, in which case the drawer can only be opened when the proper combination of keys shall have been pressed, but in all cases the lever of key 34 will be made to engage the catch on the drawer, so that when the drawer is opened the fact will be indicated on the strips of paper.

The movable frame or carriage D will be retained in a normal position by means of a spring 42.

Various slight changes might be made in the details of construction of my invention without departing from the spirit thereof or limiting its scope, and hence I do not wish to limit myself to the precise details herein set forth.

Having fully described my invention, what I claim as new, and desire to secure by Letters Patent, is—

1. The combination with a frame, a pad and printing devices connected with said frame, of a carriage constructed and adapted to carry strips of paper and supply the same under the pad, an inking device and means for moving said carriage in a direction at right angles to the movement of the paper strips, substantially as and for the purpose set forth.

2. The combination with a casing and a sliding carriage, of devices for printing on a strip of paper passing over said carriage, rollers mounted on said carriage and between which said strip of paper is fed from the machine, type on one of said rollers for printing a business-card on said strip, a removable dating-block carried by said roller and an inking-pad attached to the casing for supplying ink to the type on said roller, substantially as set forth.

3. The combination with a casing and a sliding carriage, of two strips of paper mounted on said carriage, means for moving said carriage in a direction at right angles to the movement of the paper strips, devices for printing a business transaction on both strips simultaneously, means for feeding said strips of paper independently of the movement of the carriage and retaining one of them within the machine for a record of a transaction, and devices for ejecting the printed portion of the other strip from the machine and simultaneously print a business-card and a date thereon, substantially as set forth.

4. The combination with a fixed frame and printing devices connected therewith, of a movable frame or carriage, devices mounted on said movable frame or carriage for carrying and feeding strips of paper, and a toothed rod connected to said movable frame or carriage, said toothed rod projecting through the casing of the machine and provided with a knob or handle, substantially as set forth.

5. The combination with a fixed frame and type-writing devices connected therewith, of a movable frame, devices mounted on said movable frame for carrying and feeding strips of paper to be printed, rollers carried by the movable frame and adapted to receive one of said strips of paper between them, printing-types on one of said rollers, a knob connected to the shaft of the printing-roller, a rod or bar connected to the movable frame and a knob on said rod or bar, substantially as set forth.

6. The combination with a fixed frame and printing or type-writing devices connected with said fixed frame, of a movable frame having an opening in its top, a pad carried by the fixed frame, over the opening in the movable frame, two paper-supply rolls, strips of paper from said rolls passing under said pad, a spring-drum on which one of said strips is wound, means for preventing said drum from unwinding, rollers between which the other strip passes, means for rotating said rollers, and printing devices on one of said rollers, substantially as set forth.

7. The combination with a fixed frame and printing devices connected therewith, of a movable frame carrying strips of paper, guide-rollers on the movable frame, for one of said strips, a receiving-drum for one of said strips of paper, rollers between which the other strip passes, and means for turning said drum and rollers, substantially as set forth.

8. The combination with a casing, a frame, a strip of paper on said frame, and a series of key-levers, of types connected with said key-levers, a spring-actuated drawer, a catch on said drawer, a latch on one of said key-levers and adapted to engage the catch on the drawer, and a type on the key-lever having the latch, adapted to print a character on the paper strip indicating that the drawer has been opened, substantially as set forth.

9. The combination with a guide-bar and two movable collars thereon, of a key-lever connected with one of said sleeves and a pivoted type-bar connected with the other sleeve, substantially as set forth.

10. The combination with a guide-bar and two movable sleeves thereon, of a type-bar pivotally connected at the upper end of the guide-bar, a link connecting said type-bar with one of the collars, a pivoted key-lever and a link connecting said key-lever with the other collar, substantially as set forth.

11. The combination with suitable framework, of a series of key-levers, type-bars connected with said key-levers, said type-bars being provided with type adapted to print figures and letters indicating "debit" and "credit," a carriage, two paper strips mounted on said carriage, means for feeding said strips, means for moving said carriage in a direction at right angles to the movement of the paper strips whereby debit and credit accounts can be printed on said strips and means for ejecting the printed portions of one of said paper strips, whereby to render a debit and credit account to a customer, substantially as set forth.

In testimony whereof I have signed this specification in the presence of two subscribing witnesses.

GEORGE P. GASTON.

Witnesses:
C. C. HORTON,
R. J. QUALE.